(12) United States Patent
Irvin

(10) Patent No.: US 6,177,117 B1
(45) Date of Patent: Jan. 23, 2001

(54) CHEESECAKE STANDARDIZATION METHOD AND PRODUCT THEREOF

(75) Inventor: Scot Alan Irvin, Grayslake, IL (US)

(73) Assignee: Kraft Foods, Inc., Northfield, IL (US)

(*) Notice: Under 35 U.S.C. 154(b), the term of this patent shall be extended for 0 days.

(21) Appl. No.: 09/426,781

(22) Filed: Oct. 22, 1999

(51) Int. Cl.[7] ................... A23L 1/052; A23L 1/0526; A23C 19/09
(52) U.S. Cl. ................... 426/582; 426/523; 426/573; 426/586
(58) Field of Search ................... 426/582, 573, 426/586, 523

(56) References Cited

PUBLICATIONS

"Seasonal and Regional Variation in Milk Composition in the U.S.", D. M. Barbano, pp. 1–18, from "Proceedings, 1990 Cornell Nutrition Conference for Feed Manufacturers", Oct. 23–25, 1990, Holiday Inn, Genesee Plaza, Rochester, N.Y., Departments of Animal Science and Poultry and Avian Sciences of the New York State College of Agriculture and Life Sciences, Cornell University, Ithaca, N.Y. (18 pages).

Dairy Processing Handbook/Chapter 2, entitled "The Chemistry of Milk", pp. 13–37 and 362–363 (No date available).

*Primary Examiner*—Helen Pratt
(74) *Attorney, Agent, or Firm*—Fitch, Even, Tabin & Flannery

(57) ABSTRACT

A method of preparing a cheesecake filling is disclosed that significantly reduces or eliminates the appearance of cracks on the surface and in the body of the filling upon baking. The method furthermore reduces the occurrence of the stadium effect to within an acceptable extent. These advantageous attributes are provided while still retaining the overall texture, taste, and organoleptic properties that the consuming public finds acceptable and pleasing. The method includes blending cream cheese curd with a composition including sufficient cream and/or non-fat dry milk to prepare a blend with a protein/fat ratio in the blend is in the range 0.182 to 0.186, and then preparing and baking the cheesecake. In an important embodiment of the method, the protein content of the cream cheese curd is estimated using a mathematical model to account for seasonal changes of the protein level in the cream cheese curd. The estimated protein level of the cream cheese curd can then be used to determine the amounts of cream and/or non-fat dry milk to be added to achieve the desired protein/fat ratio.

19 Claims, 2 Drawing Sheets

CHEESECAKE STANDARDIZATION METHOD AND PRODUCT THEREOF

FIELD OF THE INVENTION

This invention relates to a method of formulating the cream cheese filling component of a cheesecake which retains consistency in the desired structure and appearance of the baked cheesecake product throughout the year in spite of significant seasonal variations in the starting components or ingredients. This method is especially directed to the dry bake method or process of cheesecake production. The method recognizes and accounts for seasonal variation in the composition of the ingredients, especially the cream cheese, over the year. By carefully controlling the protein to fat ratio in a narrow range, high quality cheesecakes (i.e., without significant blisters, cracks, or other defects) can consistently be made on a commercial scale using the dry bake method or process.

BACKGROUND OF THE INVENTION

Two main commercial processes are typically used by bakers to produce cheesecakes. In the wet bake process, steam is introduced into the oven to provide a high relative humidity. Using this method, cheesecakes can be produced having relatively few cracks; the upper portion of the cheesecake does not obtain the desired golden and smooth surface. Using the dry bake process, a resulting golden and smooth surface can be obtained; such a surface, however, may be subjected to a significant amount of cracking and other surface defects.

Cream cheese is prepared from milk with the addition of supplemental amounts of cream to form the cream cheese curd. The cream cheese filling of cheesecake includes non-fat dry milk, water, and cream, in addition to a significant amount of cream cheese. The assignee of this invention has undertaken to prepare cheesecakes on a commercial scale using essentially 100 percent of a high quality cream cheese (i.e., Philadelphia Cream Cheese™), as opposed to a blend using such a high quality cream cheese in combination with a significant amount of other products (including cream cheese). Generally, products resulting from dry baking a cheesecake using essentially 100 percent of a high quality cream cheese, although yielding an excellent tasting cheesecake product, often suffered from cracks on the surface of the cheesecake, which often significantly penetrated into the body of the cheesecake, and other defects (e.g., blisters and the like). Furthermore, such baked cheesecakes often had significantly lower centers (as compared to the outer portion); this so-called "stadium effect" is considered a defect. These cosmetic defects detract from consumer acceptability of the product, especially when the cheesecake is to be sold "as is" (i.e., without a topping which would tend to hide or mask the defects). As a consequence, cheesecakes having cracks, stadium effects, or other cosmetic defects are often discarded, leading to waste, increased manufacturing costs, and decreased profitability.

The protein content, as well as other components, in dairy liquids used in the manufacture of cream cheese, and thus in the cheesecakes using such cream cheese, varies through the course of a year in a seasonal cycle. These variations are likely due, at least in part, to the distribution of nutrients available to dairy cows during the year and, perhaps, hormonal and other cyclic changes affecting dairy cows. Moreover, these variations in protein levels (as well as other components) can be modulated by local weather conditions, bread of cows in the herd, and the like. Nevertheless, bakeries conventionally employ a single standard recipe for preparing the cheesecake batter and do not, therefore, adjust for seasonal changes in the dairy products used. Rather, bakeries normally use changes in the baking process (e.g., temperatures, time, and the like) to correct for the seasonal variations. Such process modifications, of course, require skilled bakers and, in many cases, considerable trial and error. Even in the hands of a skilled baker, considerable losses occur.

There is therefore a need to provide a method of preparing a cheesecake filling that reduces or eliminates the incidence of cracking on the surface and in the body of the cheesecake upon dry baking. There is also a need to provide a method that eliminates or substantially reduces unacceptable stadium effects. There is furthermore a need to account for seasonal variation in the components, especially the protein content, of the dairy ingredients used in preparing cheesecake batters in a way that standardizes the composition of the batter throughout an annual cycle. These needs should be met, of course, while still retaining, and even increasing, the overall texture, taste, and organoleptic characteristics of a cheesecake filling that the consuming public finds acceptable and pleasing. As one of ordinary skill in the art will realize upon considering this specification, the methods of the present invention realizes these objectives and allows the production of superior cheesecakes regardless of the seasonal variations of the components used.

SUMMARY OF THE INVENTION

A method of preparing a cheesecake filling is provided that significantly and consistently reduces or eliminates the appearance of cracks and other defects on the surface and/or in the body of the filling upon baking. The method furthermore significantly and consistently reduces the occurrence of the stadium effect to within acceptable limits. These advantageous attributes are provided while still retaining the overall texture, taste, and organoleptic properties that the consuming public finds acceptable and pleasing. Indeed, because this methods allows the production of cheesecakes using only high quality cream cheese, the resulting cheesecakes are generally superior to other commercially available cheesecakes. Moreover, by allowing the cheesecakes to be prepared using only a single, high quality cream cheese, avoids the need to stock two or more cream cheese products and the need to blend the cream cheese products. The method includes the steps of: (1) providing a cream cheese curd containing from about 6.0 to about 8.0 percent protein, from about 33 to about 37 percent fat, and from about 52.5 to about 55 percent moisture; (2) blending the cream cheese curd with cream and non-fat dry milk to prepare a cream cheese blend having a protein/fat ratio in the range of 0.182 to 0.186, wherein the cream cheese blend contains about 70 to about 90 percent cream cheese curd, about 5 to 25 percent cream, and about 0.5 to about 2.5 percent non-fat dry milk; (3) preparing a cheesecake filling including the cream cheese blend, eggs, sugar, flour, milk, and flavorings; (4) introducing the cheesecake filling into a cheesecake crust to provide an unbaked cheesecake; and (5) dry baking the unbaked cheesecake to provide the baked cheesecake. More preferably, the method includes the steps of: (1) providing a cream cheese curd containing from about 6.1 to about 7.6 percent protein, from about 34 to about 36 percent fat, and from about 52.5 to about 55 percent moisture; (2) blending the cream cheese curd with cream and non-fat dry milk to prepare a cream cheese blend having a protein/fat ratio in the range of 0.182 to 0.186, wherein the cream cheese blend contains about 70 to about 90 percent cream cheese curd, about 5 to 25 percent cream, and about 0.5 to about 2.5 percent non-fat dry milk; (3) preparing a cheesecake filling including the cream cheese blend, eggs, sugar, flour, milk, and flavorings; (4) introducing the cheesecake filling into a cheesecake crust to provide an unbaked cheesecake; and (5) dry baking the unbaked cheesecake to provide the baked cheesecake. Preferably, the cheesecake filling contains about 63 to about 68 percent cream cheese blend, about 8 to about 15 percent eggs, about 1 to about 5 percent milk, and about 10 to about 20 percent flavorings (e.g., vanilla or lemon at about 0 to about 1 percent) and other ingredients (e.g., flour at about 1 to about 4 percent and/or sugar at about 10 to about 15 percent). More preferably, the cheesecake filling contains about 65 to about 67 percent cream cheese blend, about 14 to about 15 percent eggs, about 2.8 to about 3.0 percent milk, and about 15 to about 18 percent flavorings and other ingredients. The protein/fat ratio of the cream cheese blend is adjusted to about 0.182 to about 0.186, and more preferably to about 0.183 to about 0.185. Although the ingredients added to the cream cheese blend to form the cheesecake filling will effect the protein levels, it does not appear necessary to take such levels into account in adjusting the protein to fat ratio of the cream cheese blend. In other words, the system is sufficiently robust that only the protein to fat ratio of the cream cheese blend needs to be controlled. Even more preferably, the cream cheese blend has target values of about 34.8 percent fat, about 6.4 percent protein, about 0.184 for the protein/fat ratio, and about 53.5 percent moisture.

DETAILED DESCRIPTION OF THE INVENTION

The present invention provides a method for standardizing the cream cheese, cream, and non-fat dry milk components in a cheesecake blend used to prepare a cheesecake batter. By controlling the protein/fat ratio, and preferably the moisture content as well, in the blend, a high quality cheesecake can consistently be made through out the year in spite of seasonal variations in the composition of the starting materials. The method recognizes the cyclical or seasonal variation of the protein content of the dairy liquids, primarily milk, but secondarily the cream as well, employed in preparing cream cheese curd, throughout the course of the year. The method provides for controlling and/or adjusting protein/fat ratio of the cream cheese blend to a narrow range (i.e., 0.182 to 0.186) and maintaining the moisture content within predetermined limits (i.e., about 52.5 to about 55 percent). By doing so, defects normally arising in cheesecake baking from the seasonal variation of starting materials can be substantially reduced or eliminated. The standardization involves varying only the amount of fat, in the form of added cream, (and secondarily, if necessary, varying the amount of non-fat dry milk) used in the cheesecake blend, and the amount of moisture added to it. A vegetable gum such as locust bean gum or guar gum is added to the filing or batter in order to reduce further the occurrence of cracks. Preferably a mixture of locust bean gum and guar gum is normally incorporated at a level of about 0.02 to about 0.045 percent for the locust bean gum and a level of about 0.1 to about 0.2 percent for guar gum (based on the total weight of the cheesecake filling or batter). The addition of gum appears to enhance the elastic nature of the filling and reduce surface cracking. These added gums are in addition to any gums that may be added with the other ingredients (e.g., cream cheese curd); the cream cheese curd can, for example, contain locust bean gum (normally about 0.1 to about 0.3 percent based on the total weight of cream cheese curd). The method of the invention may be practiced on site at a bakery preparing cheesecakes. Alternatively, it may be implemented at a central or regional site by preparing the cheesecake filling in bulk, and then shipping the formulated batter to nearby bakeries. Generally, the preparation at a central or regional site is preferred since the protein/fat ratio can be more easily controlled or adjusted in large batches in a central location with the appropriate analytical equipment and expertise. The method of this invention is especially directed to commercial cheesecake manufacture using the dry baking technique or process.

Figure 2:
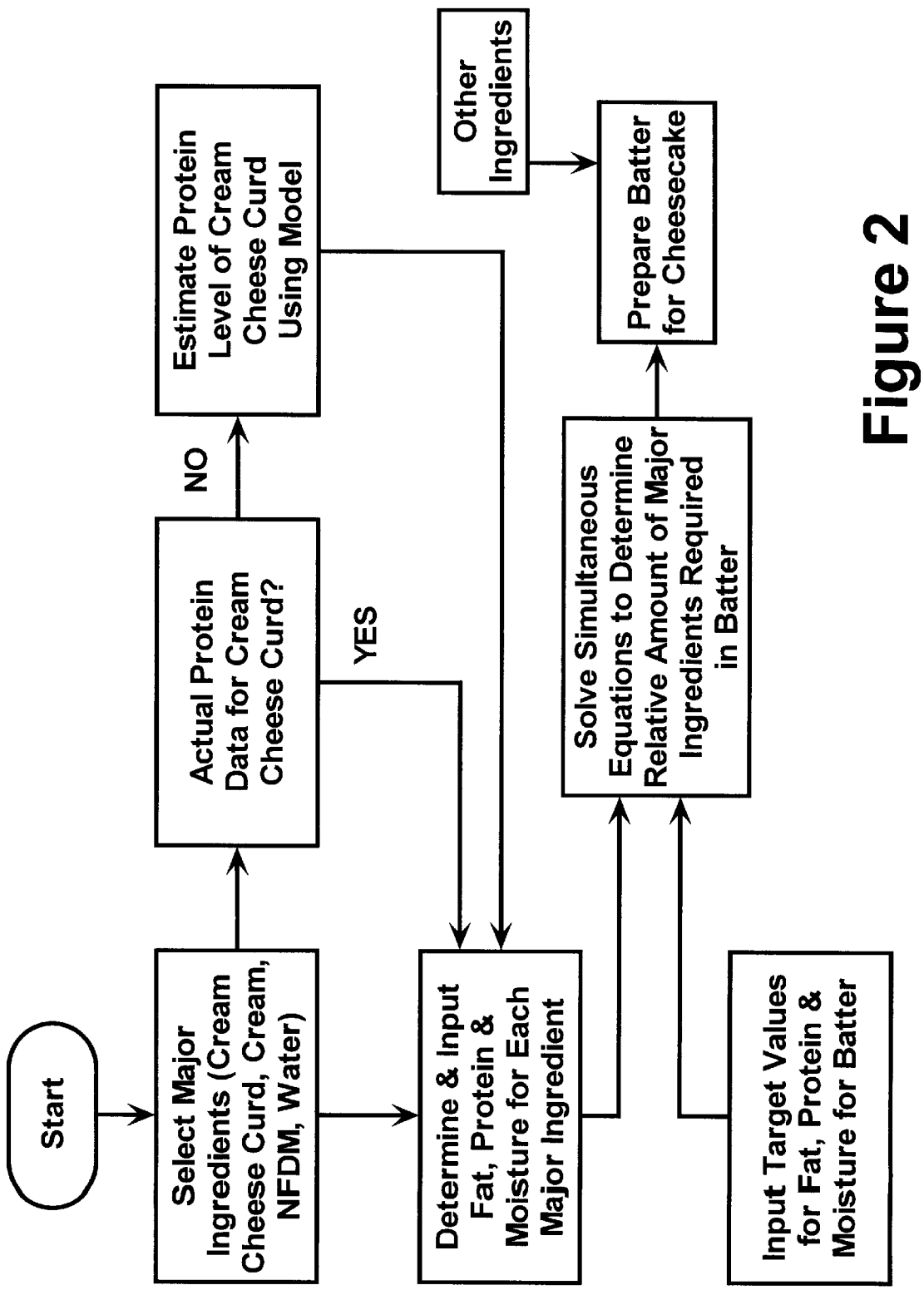
FIG. 2 provides a flow diagram illustrating the general method of this invention.

The standardization method may be applied to a three-component system (i.e., a cream cheese blend of cream cheese curd, cream, and non-fat dry milk) in order to adjust the protein/fat ratio to the desired range. Preferably, however, the method is applied to a four-component system (i.e., a cream cheese blend of cream cheese curd, cream, non-fat dry milk, and water) as illustrated in FIG. 2. Such a four component system generally provides the best results, especially when applied to large scale production of the cheesecake filling.

Although it is generally preferred that the protein/fat ratio is measured and adjusted using conventional laboratory analytical procedures, the protein levels of the starting material cream cheese curd can be estimated using on historical data. For example, the seasonal variation in the protein level of the cream cheese curd can be estimated using a mathematical model based on a cosine type function. Preferably, the protein level of the cream cheese curd is estimated using a mathematical model of the general form $$\text{estimated protein (\%)} = \text{constant} + x(\cos(\theta))$$

wherein $x(\cos(\theta))$ is a correction factor to account for the seasonal variations in the milk used to prepare the cream cheese curd, x is a second constant, and $\theta$ corresponds to the month of the year in which the cream cheese curd is prepared. Preferably both the constant and the correction factor are determined from data generated over at least a full year. Using historical data from upper Midwest dairy herds over approximately a three year period, the protein level can be estimated using the following formula $$\text{estimated protein (\%)} = 6.78 + 0.44(\cos(\theta))$$

where $0.44 \cos(\theta)$ is the correction factor to account for the seasonal variation in the milk used to prepare the cream cheese curd. Further, based on this historical data gathered, $\theta$ and the correction factor ($X = 0.44(\cos(\theta))$ in the following Table) vary as follows over the year:

TABLE 1

Monthly Protein Variation in Cream Cheese Curd.

| Month | θ | X (%) |
| --- | --- | --- |
| January | 48 | 0.306 |
| February | 82 | 0.061 |
| March | 85 | 0.038 |
| April | 95 | −0.038 |

TABLE 1-continued

Monthly Protein Variation in Cream Cheese Curd.

| Month | θ | X (%) |
|---|---|---|
| May | 127 | −0.265 |
| June | 135 | −0.311 |
| July | 180 | −0.440 |
| August | 210 | −0.381 |
| September | 275 | 0.038 |
| October | 328 | 0.373 |
| November | 345 | 0.425 |
| December | 360 | 0.440 |

Figure 1:
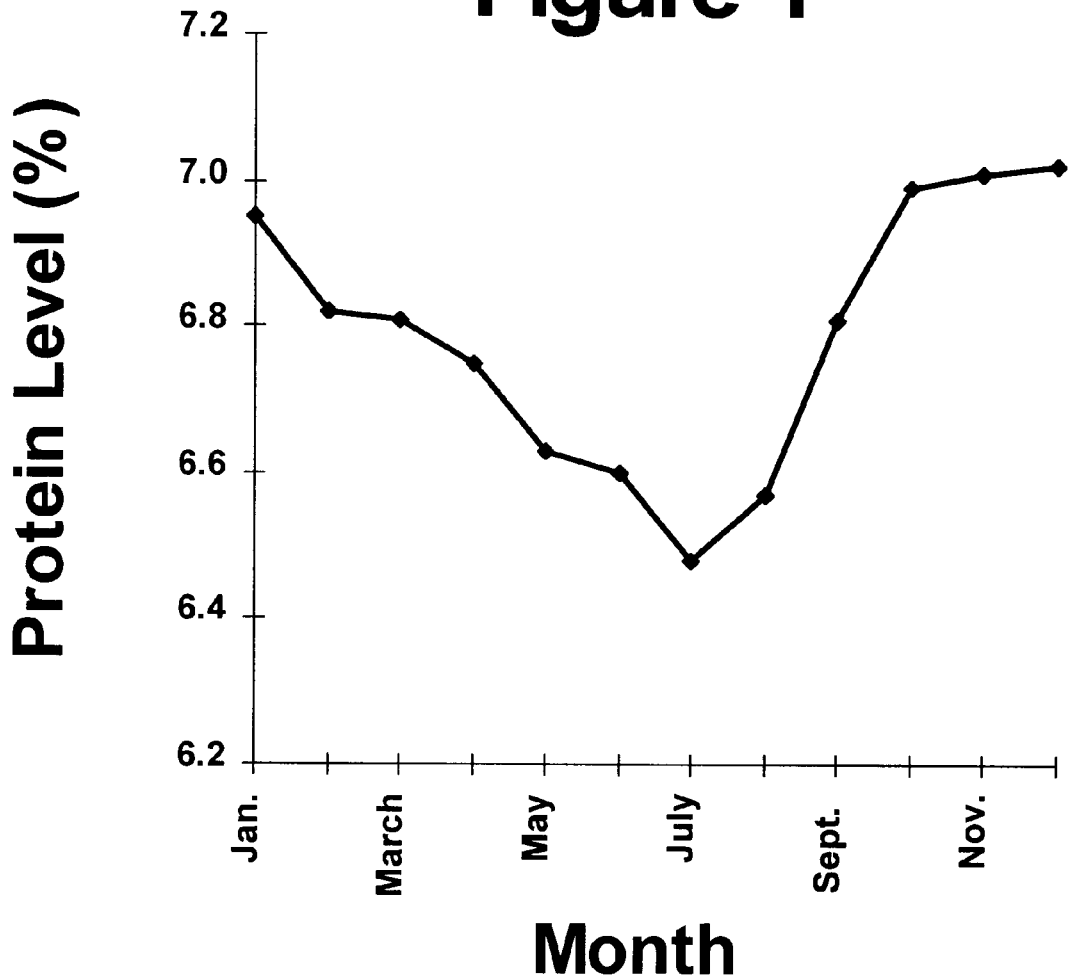
FIG. 1 presents the typical variation of the protein level in cream cheese curd throughout the course of a year.

FIG. 1 also illustrates the seasonal variation of the protein levels. As shown in the above Table 1 and FIG. 1, θ appears to approximate the cumulative number of days in the yearly cycle. This approximation appears to more accurately fit summer/fall time period (July–December), followed by spring (April–June), and less accurately in the winter months (January–March). The better fit to the cosine function may reflect the more consistent feed quality during the summer and fall months and the improving feed quality during the spring. As those skilled in the art will realize, this mathematical model can only be used to estimate the protein level in a given sample. Moreover, the constant and the correction factor X for the various months may be expected to change as the amount of data in the historical database increases. As those skilled in the art will also realize, the constant and the correction factor X can also vary depending on the specific conditions of a particular year (i.e., temperature, rainfall, type of dairy cows in herd) as well as in different regions of the country and/or world. Nonetheless, the model (especially for normal years in the area in which the data was gathered) will provide an estimate to begin the adjustment of the protein/fat ratio. The adjustments can then be continued using trial and error to achieve the desired ratio (as evidenced by the lack of significant defects in the finished product). Although the model was developed from Midwestern dairy herds, it appears to reasonably predict the protein content of cream cheese curd produced in other parts of the country.

Of course, where possible and available, analytical procedures are preferably used to determine and adjust the protein/fat ratio. The predictive capability of this mathematical model, however, will be especially useful in individual bakeries where sampling of cream cheese and analysis of its protein content may not be widely practiced nor sufficiently rapid for convenient use during formulation. Moreover, the use of this mathematical model is especially helpful due to the general difficulty of obtaining accurate and precise protein levels in real time situations. Based on a comparison of actual experimental results and those predicted by the model, predicted protein levels are generally within about 1 to 2 percent of the experimentally determined protein levels.

A central or regional site can produce the cream cheese blend and/or the cheesecake filling in large, standardized batches and ship the resulting cream cheese blend and/or the cheesecake filling to individual bakeries. Indeed, it is largely this ability of such a central or regional site to produce the cream cheese blend and/or the cheesecake filling with the desired, and accurately determined, protein/fat ratio for a large number of bakeries which makes this mode of distribution preferably. The actual adjustment in the protein/fat ratio could be made at either the central location or at the actual bakery facility; in either case, the adjustment should preferably be made using the values determined at the central location regardless of whether these values are determined experimental or through the use of the model.

FIG. 2 illustrates the present method as applied to a four-component system. First, the desired ingredients (cream cheese curd, cream, non-fat dry milk, and water) which will be used to prepare the cream cheese blend are selected. Although it is generally preferred that only a single high quality cream cheese curd is employed, two or more cream cheese curds can be used if desired. After selection of the ingredients, the fat, protein, and moisture levels for each of the major ingredients are determined. As noted above, it is generally preferred that the fat, protein, and moisture levels for each of these ingredients are determined experimentally. In many cases, however, the protein level of the cream cheese curd will be more easily determined using the model described above. Once the data for the major ingredients is obtained, a set of simultaneous equations is generated using the desired target values for fat, protein, and moisture in the cream cheese batter. Using a single cream cheese curd, such simultaneous equations will be of the following forms:

Equation 1 for protein content:

$$T_{protein} = \{100 * \sum [(A_{protein})_i * W_i]\} / W_T$$
$$100 / W_T * [(A_{protein})_{ccc} * W_{ccc} + (A_{protein})_{cream} * W_{cream} +$$
$$(A_{protein})_{nfdm} * W_{nfdm}]$$

Equation 2 for fat content:

$$T_{fat} = \{100 * \sum [(A_{fat})_i * W_i]\} / W_T$$
$$= 100 / W_T * [(A_{fat})_{ccc} * W_{ccc} + (A_{fat})_{cream} * W_{cream} +$$
$$(A_{fat})_{nfdm} * W_{nfdm}]$$

Equation 3 for moisture:

$$T_{mositure} = \{100 * \sum [(A_{moisture})_i * W_i]\} / W_T$$
$$100 / W_T * [(A_{moisture})_{ccc} * W_{ccc} +$$
$$(A_{moisture})_{cream} * W_{cream} +$$
$$(A_{moisture})_{nfdm} * W_{nfdm} + W_{moisture}]$$

and Equation 4:

$$W_T = \sum W_i$$
$$= W_{ccc} + W_{cream} + W_{nfdm} + W_{moisture}$$

where $T_{protein}$ is the total protein (in percentage) in the blend, $T_{fat}$ is the total fat (in percentage) in the blend, $T_{mositure}$ is the total moisture (in percentage) in the blend, $(A_{protein})_i$ is the percentage protein in component i, $(A_{fat})_i$ is the percentage fat in component i, $(A_{moisture})_i$ is the percentage moisture in component i, $W_i$ is the added amount or weight of component i in the blend, and $W_T$ is the total weight of the blend. In most cases, $A_{fat}$ for the non-fat dry milk in equation 2 will be zero (or sufficiently close to zero to be ignored); if desired, the fat level of the non-fat dry milk can be taken into account in these equations.

The target value for total protein is about 6.1 to about 6.7 percent with about 6.5 percent being preferred. The target value for total fat is about 33 to about 36.2 percent with about 35.2 percent being preferred. The target value for total moisture is about 52.5 to about 55 percent with about 53.5 percent begin preferred. Although not included as a variable in these equations, the overall target value for pH is about 4.6 to about 5 with about 4.8 being preferred. Preferably, the total protein to total fat ratio of the resulting cream cheese blend is in the range of about 0.182 to about 0.186 and more preferably about 0.184.

Using the selected target values, the four equations are solved to determine the required amounts of the four ingredients (i.e., cheese cream curd, cream, non-fat dry milk, and water) in the cream cheese blend. The simultaneous equations can be solved using conventional techniques, including, for example, commercially available software systems (e.g., spreadsheets, mathematical models, and the like). One such software system is Microsoft's Exel Matrix Solver. Once the relative amounts of the four components has been determine, the cheesecake batter (including other ingredients) can be prepared. Using this batter, cheesecakes can be prepared using conventional baking techniques. Based on the resulting cheesecakes, minor modifications in the relative amounts of ingredients can be made if desired.

As noted above, this system can be used with two or more cream cheeses curds with appropriate modifications. For example, two cream cheese curds would provide four simultaneous equations with five unknowns (i.e., amounts of cream cheese curd 1, cream cheese curd 2, cream, non-fat dry milk, and water). These equations can be solved for a given ratio of cream cheese curd 1 and cream cheese curd 2. In other words, a fifth equation of the form $$A_{ccc1}/A_{ccc2} = X$$

is required where $A_{ccc1}$ and $A_{ccc2}$ are the amounts of cream cheese curds 1 and 2, respectively, and X is a predetermined ratio or value. For a given value or ratio of X, the five equations can be solved to determine the required amounts of cream cheese curd 1, cream cheese curd 2, cream, non-fat dry milk, and water. If desired, these equations can be solved for a number of values of the ratio X, one of which is selected to be used in the preparation of the cheesecake batter.

A three component system (i.e., cream cheese curd, cream, and non-fat dry milk) can provide similar equations and solutions as described above (except, of course, without the moisture or water terms). It has been found, however, that controlling the water content (i.e., the four component system) provides an improved cheesecake production system and is, therefore, preferred.

The following examples are intended to illustrate the invention and not to limit it. Unless otherwise noted, all percentages and ratios are by weight.

Example 1. Three experimental batches of cream cheese prepared in March were used to prepare cheesecakes. At that time the model for predicting the protein level of the cream cheese curd was as follows:

$$\text{estimated protein } (\%) = 6.93 + 0.44(\cos(\theta))$$

wherein $\theta$ is given in Table 1. Based on this model, the protein level of the cream cheese curd was 6.97 percent; the cream cheese curd also contained about 0.2 percent locust bean gum (LBG). Composition data for the cream cheese curd, cream, and non-fat dry milk are provided in Table 2. Except for the protein content of the cream cheese curd, all compositional data was determined experimentally.

TABLE 2

Composition Data for Major Ingredients.

| | | |
|---|---|---|
| Cream Cheese Curd | Fat (%) | 34.5 |
| | Protein* (%) | 6.97 |
| | Moisture (%) | 54.7 |
| Cream | Fat (%) | 40.0 |
| | Protein (%) | 1.66 |
| | Moisture (%) | 56.0 |
| Non-Fat Dry Milk | Fat (%) | 0.5 |
| | Protein (%) | 33.6 |
| | Moisture (%) | 3.5 |

*Determined using model.

Target values for the four variables (i.e., protein, fat, and moisture) in each of three batches of cream cheese blends are given in Table 3.

TABLE 3

Target Values.

| | Batch 1 | Batch 2 | Batch 3 |
|---|---|---|---|
| Fat (%) | 34.8 | 34.8 | 34.8 |
| Protein (%) | 6.19 | 6.30 | 6.40 |
| Moisture (%) | 53.5 | 53.5 | 53.5 |
| Protein/Fat | 0.178 | 0.181 | 0.184 |

Using the ingredients' composition data and the target values, the desired amounts of the major ingredients (i.e., cream cheese curd, cream, non-fat dry milk, and water) were determined. Table 4 provides the composition of the batters:

TABLE 4

Batter Compositions.

| | Batch 1 | Batch 2 | Batch 3 |
|---|---|---|---|
| Cream Cheese Curd | 62.93 | 66.40 | 70.0 |
| Cream | 32.27 | 29.33 | 26.27 |
| Non-fat Dry Milk | 3.71 | 3.44 | 3.17 |
| Water | 0.70 | 0.43 | 0.16 |
| Salt | 0.15 | 0.15 | 0.15 |
| Guar Gum* | 0.20 | 0.20 | 0.20 |
| Locust Bean Gum* | 0.04 | 0.04 | 0.04 |

*Added directly to the batter. The starting cream cheese curd also contained about 0.2 percent locust bean gum.

Analytical results obtained with these batters are shown in Table 5.

TABLE 5

Analyses of Cream Cheese Batters.

| Batch | Batter Moisture (%) | Batter Protein (%) Target | Batter Protein (%) Measured | Batter Fat (%) | Batter Protein/Fat Ratio Target | Batter Protein/Fat Ratio Measured | pH |
|---|---|---|---|---|---|---|---|
| 1 | 53.41 | 6.19 | 6.12 | 34.94 | 0.178 | 0.175 | 4.95 |
| 2 | 52.84 | 6.30 | 6.15 | 34.63 | 0.181 | 0.178 | 5.05 |
| 3 | 52.81 | 6.40 | 6.14 | 34.51 | 0.184 | 0.178 | 5.06 |

Eggs, sugar, milk, flour, and flavorings were added to the above cream cheese batters to make the finished mixes. Each finished mix was poured into 120 pans. Control cheesecakes were made with 60 to 40 blend of a high quality cream cheese and another, lower quality cream cheese (i.e., a conventional cream cheese blend normally used in commercial bakeries). After baking (at about 300 to 400° F. for about 60 minutes using the dry bake process), the cheesecakes were removed from their pans, frozen, and packaged. The overall results are shown in Table 6.

TABLE 6

Properties of Cheesecakes.

| | Batter Batch | | | |
|---|---|---|---|---|
| | 1 | 2 | 3 | Control |
| Protein/fat Ratio | 0.178 | 0.181 | 0.184 | N/A |
| Batter Specific Gravity | 0.89 | 0.88 | 0.89 | 0.886 |
| Cakes with Major Cracks (%) | 0 | 8.4 | 0 | 0 |
| Cakes with Minor Cracks (%) | 0 | 8.4 | 0 | 0 |
| Overall Quality | poor; did not rise; poor texture | poor; excessive cracking | acceptable to good | generally good; but did not rise as high as desirable |

It was generally observed that the cakes, except for those prepared from batch 3 cream cheese, were lighter colored in the center, cooked with the center lower, or failed to rise, and blistered easily. The control cheesecakes also failed to rise properly. In general, it is concluded that this formulation, especially using batch 1 and batch 2 cream cheeses in which protein/fat ratio is less than 0.184, did not provide a satisfactory cheesecake product. Batch 3 cream cheese, however, provided acceptable to good cheesecakes; these cheesecakes had good center height (i.e., only small depression with little stadium effect), few blisters, blemishes, or freckles, a golden brown surface with an overall cracking rate of less than about 0.5 percent.

Example 2. Cheesecakes were prepared using a high quality cream cheese manufacture in May, June, and August of the same year as for Example 1. At this time, the model had been fine-tuned or adjusted to obtain the following equation for the protein content of the cream cheese curd:

$$\text{estimated protein } (\%) = 6.78 + 0.44(\cos(\theta))$$

wherein $0.44(\cos(\theta))$ and $\theta$ are given in Table 1. Based on this model, the protein levels of the cream cheese curds were 6.52 percent (May), 6.47 percent (June), and 6.40 percent (August). Composition data for the cream cheese curds, cream, and non-fat dry milk are provided in Table 7. Like Example 1, the cream cheese curd also contained about 0.2 percent locust been gum. Except for the protein content of the cream cheese curd, all compositional data was determined experimentally. The composition of the cream used also varied slightly month to month.

TABLE 7

Composition Data for Major Ingredients.

| Cream Cheese Curd (May) | Fat (%) | 34.6 |
| | Protein* (%) | 6.67 |
| | Moisture (%) | 54.5 |
| Cream Cheese Curd (June) | Fat (%) | 34.6 |
| | Protein* (%) | 6.47 |
| | Moisture (%) | 54.6 |
| Cream Cheese Curd (August) | Fat (%) | 34.2 |
| | Protein* (%) | 6.40 |
| | Moisture (%) | 54.6 |

TABLE 7-continued

Composition Data for Major Ingredients.

| Cream (May) | Fat (%) | 41.25 |
| | Protein (%) | 1.62 |
| | Moisture (%) | 53.5 |
| Cream (June) | Fat (%) | 41.5 |
| | Protein (%) | 1.61 |
| | Moisture (%) | 53.8 |
| Cream (August) | Fat (%) | 45.0 |
| | Protein (%) | 1.51 |
| | Moisture (%) | 51.0 |
| Non-fat Dry Milk | Fat (%) | 0.5 |
| | Protein (%) | 33.6 |
| | Moisture (%) | 3.5 |

*Determined using model.

Target values for the four variables (i.e., protein, fat, and moisture) in each of four batches of cream cheese blends (May, June (2 batches), and August) are given in Table 8.

TABLE 8

Target Values.

| | May | June #1 | June #2 | August |
|---|---|---|---|---|
| Fat (%) | 34.8 | 34.8 | 34.8 | 34.6.8 |
| Protein (%) | 6.33 | 6.33 | 6.40 | 6.38 |
| Moisture (%) | 53.5 | 53.5 | 53.5 | 53.5 |
| Protein/Fat | 0.182 | .0182 | 0.184 | 0.184 |

Using the ingredients' composition data and the target values, the desired amounts of the major ingredients (i.e., cream cheese curd, cream, non-fat dry milk, and water) were determined. Table 9 provides the composition of the batters:

TABLE 9

Batter Compositions.

| | May | June #1 | June #2 | August |
|---|---|---|---|---|
| Cream Cheese Curd | 86.37 | 82.67 | 85.23 | 89.08 |
| Cream | 11.49 | 14.53 | 12.4 | 8.98 |
| Non-fat Dry Milk | 1.68 | 2.15 | 1.96 | 1.53 |
| Water | 0.06 | 0.26 | 0.21 | 0.02 |
| Salt | 0.15 | 0.15 | 0.15 | 0.15 |
| Guar Gum* | 0.20 | 0.20 | 0 | 0.20 |
| Locust Bean Gum* | 0.04 | 0.04 | 0.05 | 0.04 |

*Added directly to the batter. The cream cheese curd also contained about 0.2 percent locust bean gum.

Analytical results obtained with these batters are shown in Table 10.

TABLE 10

Analyses of Cream Cheese Batters.

| Batch | Batter Moisture (%) | Batter Protein (%) Target | Batter Protein (%) Measured | Batter Fat (%) | Batter Protein/Fat Ratio Target | Batter Protein/Fat Ratio Measured | pH |
|---|---|---|---|---|---|---|---|
| May | 53.21 | 6.33 | 6.78 | 34.86 | 0.182 | 0.194 | 5.05 |
| June #1 | 54.30 | 6.33 | 5.90 | 33.70 | 0.182 | 0.175 | 4.94 |
| June #2 | 53.90 | 6.30 | 6.10 | 34.60 | 0.184 | 0.182 | 4.97 |
| Aug | 54.41 | 6.38 | 6.10 | 34.43 | 0.184 | 0.177 | 5.07 |

For the control cakes, the cream cheese was used "as is" (i.e., without any adjustment of the protein/fat ratio (the unadjusted protein/fat ratio was about 0.176. Cheesecake batters were prepared as in Example 1. Each of the cream cheese batters was filled into 240 cheesecakes and baked using the dry baking process. The results are shown in Table 11.

TABLE 11

Cheesecake Results.

| Batter | Calculated Protein to Fat Ratio | Specific Gravity | Comments |
|---|---|---|---|
| Control | 0.176 | 0.911 | Edge cracks. Poor rise. |
| May | 0.182 | 0.89 | No cracks. Good rise. |
| June #1 | 0.182 | 0.91 | 4.2% had cracks. Good rise. |
| June #2 | 0.184 | 0.91 | 48.3% had cracks. Poor rise and texture. |
| August | 0.184 | 0.92 | No cracks. Good rise. |

The June #2 sample, which contained relatively high levels of locust bean gum (0.05 percent), illustrates the importance of gum. Such high levels of locust bean gum as the only gum in the batter did not provide acceptable cheesecakes. However, the use of locust bean gum with guar gum or with homogenization or acidification of the batter did provide acceptable cheesecakes.

Example 3. Cream cheese curd prepared at Beaver Dam, Wis. (1993 and 1997), Springfield, Mo. (1993), Lowville, N.Y. (1993 and 1997), and Rupert, Id. (1993) were analyzed for the monthly variation in the protein content of the curd. The protein content was determined using Kjeidahl total nitrogen. The fat content was determined using the Mojonnier ether extraction method (AOAC Official Method 989.05).

The results are presented in FIG. 1 as the monthly variation in the protein content expressed on a weight percent basis. It is seen that there is a seasonal, cyclical variation in the protein content during the course of the year, with the lowest values obtained during the summer months.

Example 4. In this example, the effects of pH of the cream cheese, homogenization of the cream cheese blend, and direct addition of gum to the batter were assessed. (The cream cheese curd contained about 0.2 percent locust bean gum.) The pH was adjusted using lactic acid addition. The control batter was the same as used in Example 1. The experimental batters 1–5 were prepared using the same cream cheese which had been prepared in May. The calculated protein level as determined from the model was 6.52 percent. Analytical characterization of the batters is given in Table 12.

TABLE 12

Analyses of cream cheese batches.

| | | Batter | | |
|---|---|---|---|---|
| Batch | Moisture (%) | Fat (%) | Protein/Fat Ratio | pH |
| Control | 53.5 | 35.2 | 0.176 | 4.8 |
| 1 | 52.92 | 34.53 | 0.184 | 5.05 |
| 2 | 53.06 | 34.49 | 0.184 | 5.02 |
| 3 | 52.89 | 34.65 | 0.184 | 4.91 |
| 4 | 53.27 | 34.40 | 0.184 | 4.83 |
| 5 | 53.21 | 34.52 | 0.184 | 4.78 |

The compositions for the control and experimental batters and the results obtained are given in Table 13. In this table, "homogenized" refers to whether the cream cheese and cream were homogenized; "pH Adjusted" refers to whether pH was adjusted by the addition of lactic acid. Batter 4 contained a total of about 0.27 percent locust bean gum (including the portion contained in the cream cheese curd and the portion directly added to the batter) to the batter; batter 5 contained about 0.27 percent locust bean gum (including the portion contained in the cream cheese curd and the portion directly added to the batter) and about 0.1 percent guar gum.

Overall, 1,440 experimental cheesecakes were prepared in this trial; only two cakes from batter 5 cracked. In general, the batters of 1–4 gave good to excellent results, indicating that the use of the mathematical model for predicting the protein content of the cream cheese curd according to the method of the invention provides useful information, and leads to beneficial results in the final cheesecakes baked from these batters. Inclusion of low levels of vegetable gums in the batter tends to provide a smoother surface. Higher levels of such gums can, however, lead to crack formation and should be avoided. Preferably the cheesecake batters of this invention contain low levels of both locust bean gum (about 0.02 to about 0.045 percent) and guar gum (about 0.1 to about 0.2 percent).

TABLE 13

Compositions and Results Obtained for Cheesecake Batters.

| Batter | Homogenized | pH Adjusted | Vegetable Gum | Specific Gravity | Results and Comments |
|---|---|---|---|---|---|
| Control | No | No | None | — | No cracked cakes. OK rise with slight surface roughness. |
| 1 | No | No | None | 0.894 | No cracked cakes. Good rise, good center height, slight stadium effect. Slight surface roughness. |
| 2 | Yes | No | None | 0.873 | No cracked cakes. Good rise, good center height, minimal stadium effect. Slight surface roughness. |
| 3 | Yes | Yes | None | 0.852 | No cracked cakes. Good rise, good center height, slight stadium effect. Slight surface roughness. |
| 4 | Yes | Yes | LBG | 0.844 | No cracked cakes. Pronounced stadium effect. Optimal surface appearance. |
| 5 | Yes | Yes | LBG and Guar | 0.844 | Two cakes with edge cracks. Weak edge and surface. Too much gum, too strong. Lacks robustness. |

I claim:
1. A method of preparing a high quality baked cheesecake with a significantly reduced level of cosmetic defects, the method comprising the steps of:
  (1) providing a cream cheese curd comprising from about 6.0 to about 8.0 percent protein, from about 33 to about 37 percent fat, and from about 52.5 to about 55 percent moisture;
  (2) blending the cream cheese curd with sufficient cream, non-fat dry milk, or a mixture of cream and non-fat dry milk to provide a cream cheese blend having a protein/fat ratio in the range of 0.182 to 0.186;
  (3) preparing a cheesecake filling comprising the cream cheese blend, eggs, sugar, flour, milk, and flavorings;

(4) introducing the cheesecake filling into a cheesecake crust or pan to provide an unbaked cheesecake; and (5) baking the unbaked cheesecake to provide the baked cheesecake.

2. The method as defined in claim 1, wherein the cream cheese filing comprises about 70 to about 90 percent cream cheese blend, about 5 to 25 percent cream, and about 0.5 to about 2.5 percent non-fat dry milk.

3. The method as defined in claim 1, wherein the cream cheese curd comprises about 6.1 to about 7.6 percent protein, about 34 to about 36 percent fat, and about 53 to about 54 percent moisture.

4. The method as defined in claim 3, wherein the cream cheese filing comprises about 70 to about 90 percent cream cheese blend, about 5 to 25 percent cream, and about 0.5 to about 2.5 percent non-fat dry milk.

5. The method described in claim 3, wherein the protein/fat ratio is in the range of 0.182 to 0.186.

6. The method as defined in claim 3, wherein the protein/fat ratio in the blend is adjusted using an experimentally determined protein value for the cream cheese curd to account for seasonal variations in the cream cheese curd.

7. The method as defined in claim 3, wherein the protein/fat ratio in the blend is adjusted using an estimated protein value for the cream cheese curd derived from a mathematical model incorporating historical data to account for seasonal variations in the cream cheese curd.

8. The method as defined in claim 9, wherein the mathematical model is of the general form estimated protein (%)=constant+$x(\cos(\theta))$ wherein $x(\cos(\theta))$ is a correction factor to account for the seasonal variations in the cream cheese curd, x is a second constant, and $\theta$ corresponds to the month of the year in which the cream cheese curd is prepared and wherein both the constant and the correction factor are determined from data generated over at least a full year.

9. The method as defined in claim 8, wherein the constant is about 6.78 and the correction factor is about $0.44(\cos(\theta))$.

10. The method as defined in claim 7 wherein the mathematical model is of the general form estimated protein (%)=constant+$x(\cos(\theta))$ wherein $x(\cos(\theta))$ is a correction factor to account for the seasonal variations in the cream cheese curd, x is a second constant, and $\theta$ corresponds to the month of the year in which the cream cheese curd is prepared and wherein both the constant and the correction factor are determined from data generated over at least a full year.

11. The method as defined in claim 10, wherein the constant is about 6.78 and the correction factor is about $0.44(\cos(\theta))$.

12. The method as defined in claim 3, wherein the cheesecake filling further comprises a vegetable gum.

13. The method as defined in claim 12, wherein the vegetable gum is selected from the group consisting of locust bean gum, guar gum, and mixtures thereof.

14. The method described in claim 1, wherein the protein/fat ratio is in the range of 0.182 to 0.186.

15. The method as defined in claim 1, wherein the protein/fat ratio in the blend is adjusted using an experimentally determined protein value for the cream cheese curd to account for seasonal variations in the cream cheese curd.

16. The method as defined in claim 1, wherein the protein/fat ratio in the blend is adjusted using an estimated protein value for the cream cheese curd derived from a mathematical model incorporating historical data to account for seasonal variations in the cream cheese curd.

17. The method as defined in claim 1, wherein the cheesecake filling further comprises a vegetable gum.

18. The method as defined in claim 17, wherein the vegetable gum is selected from the group consisting of locust bean gum, guar gum, and mixtures thereof.

19. A high quality baked cheesecake with a significantly reduced level of cosmetic defects, said cheesecake being prepared by a method comprising the steps of:

(1) providing a cream cheese curd comprising from about 6.0 to about 8.0 percent protein, from about 33 to about 37 percent fat, and from about 52.5 to about 55 percent moisture;

(2) blending the cream cheese curd with sufficient cream, non-fat dry milk, or a mixture of cream and non-fat dry milk to provide a cream cheese blend having a protein/fat ratio in the range of 0.182 to 0.186;

(3) preparing a cheesecake filling comprising the cream cheese blend, eggs, sugar, flour, milk, and flavorings;

(4) introducing the cheesecake filling into a cheesecake crust to provide an unbaked cheesecake; and (5) baking the unbaked cheesecake to provide the baked cheesecake.

* * * * *